United States Patent [19]

Tobe

[11] Patent Number: 5,566,146
[45] Date of Patent: Oct. 15, 1996

[54] RECORDING/APPARATUS AND METHOD UTILIZING A PLURALITY OF HEADS FOR CONTINUOUSLY RECORDING INFORMATION AND REPRODUCING THE SAME WITH DELAY

[75] Inventor: Takeo Tobe, Tokorozawa, Japan

[73] Assignee: Pioneer Electronic Corporation, Tokyo, Japan

[21] Appl. No.: 506,252

[22] Filed: Jul. 21, 1995

Related U.S. Application Data

[63] Continuation of Ser. No. 66,577, May 26, 1993, abandoned.

[30] Foreign Application Priority Data

Jun. 2, 1992 [JP] Japan ................................. 4-141813

[51] Int. Cl.$^6$ ............................................ H04B 1/20
[52] U.S. Cl. ................................ 369/2; 369/13; 360/61
[58] Field of Search .......................... 360/61, 77.07, 360/13, 114; 369/2, 47, 48, 1, 30, 32, 13; 358/342

[56] References Cited

U.S. PATENT DOCUMENTS 4,969,135  11/1990  Tobe ................................. 369/2
5,237,547  8/1993  Ohkuma et al. .................... 369/13

Primary Examiner—Ali Neyzari
Attorney, Agent, or Firm—Kane, Dalsimer, Sullivan, Kurucz, Levy, Eisele and Richard, LLP

[57] ABSTRACT

An information recording and reproducing device for recording and reproducing information on and from a plurality of rewritable disk-type recording media includes: a plurality of recording/reproducing device for receiving and recording input information onto each of the recording medium and for reproducing and outputting the recorded information from each of the recording media with a predetermined delay time, each of the recording/reproducing device having a plurality of heads for recording and reproducing information, switching device for alternately selecting one of the reproduced information outputted from the plurality of recording/reproducing device, and control device for controlling the plurality of recording/reproducing device and the switching device. The control device permits the plurality of recording/reproducing device to continuously record the input information onto the plurality of disk-type recording media, and permits the switching device to alternately selecting one of the reproduced information so as to continuously output information reproduced by the plurality of recording/reproducing device.

5 Claims, 4 Drawing Sheets

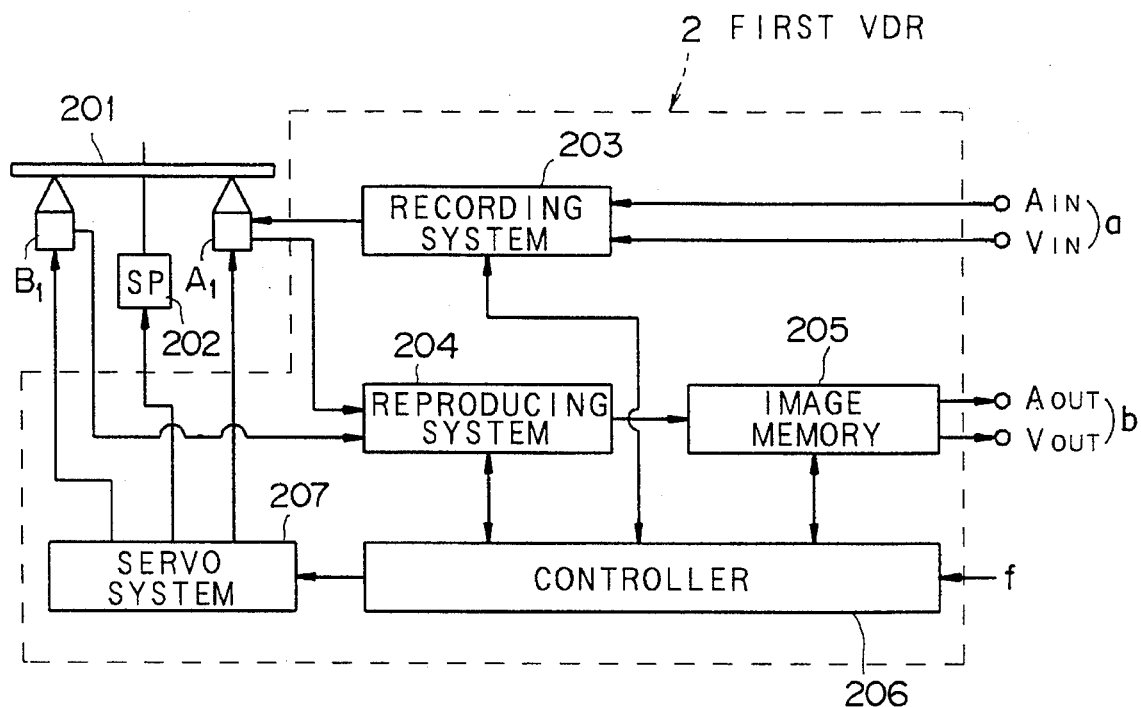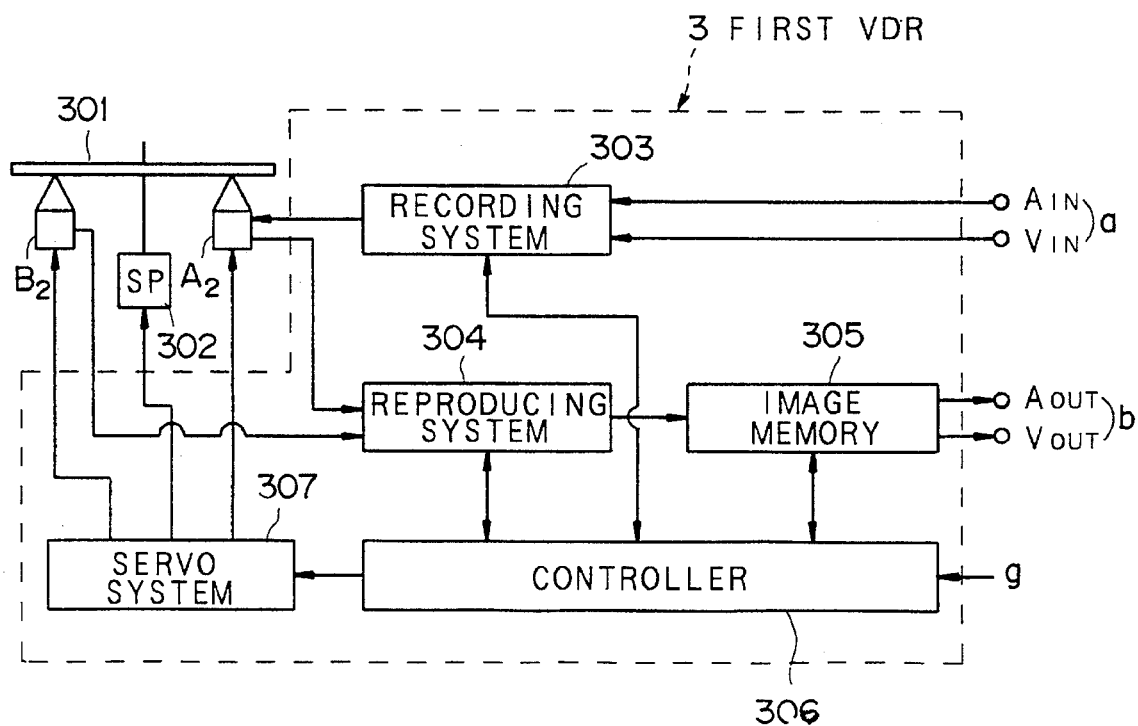

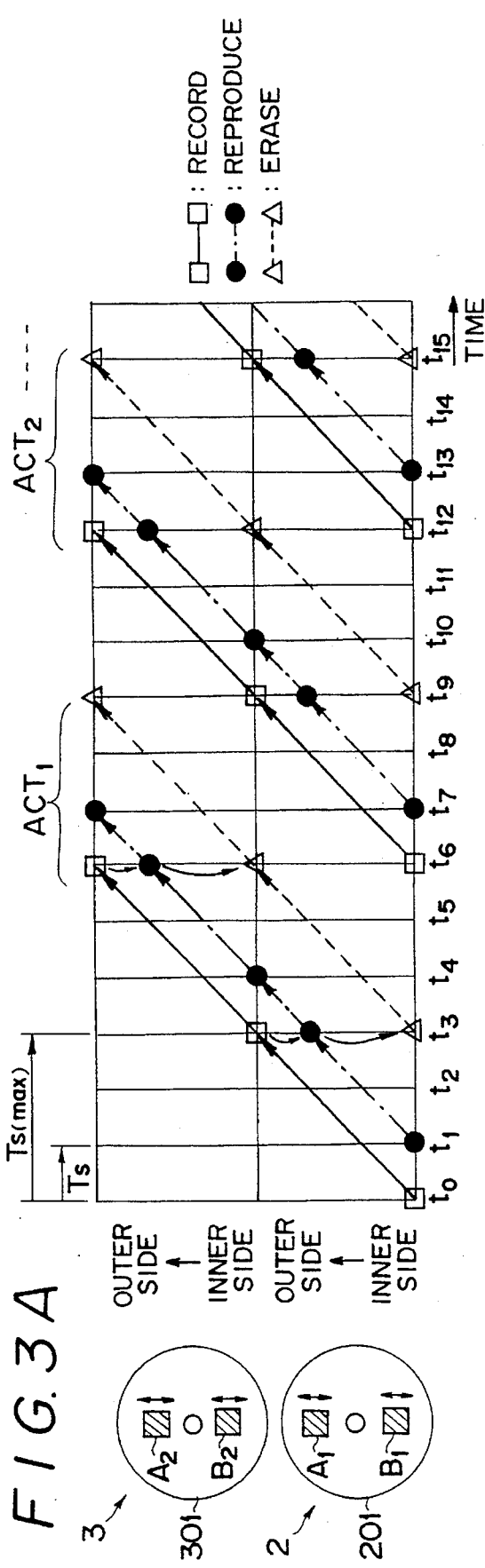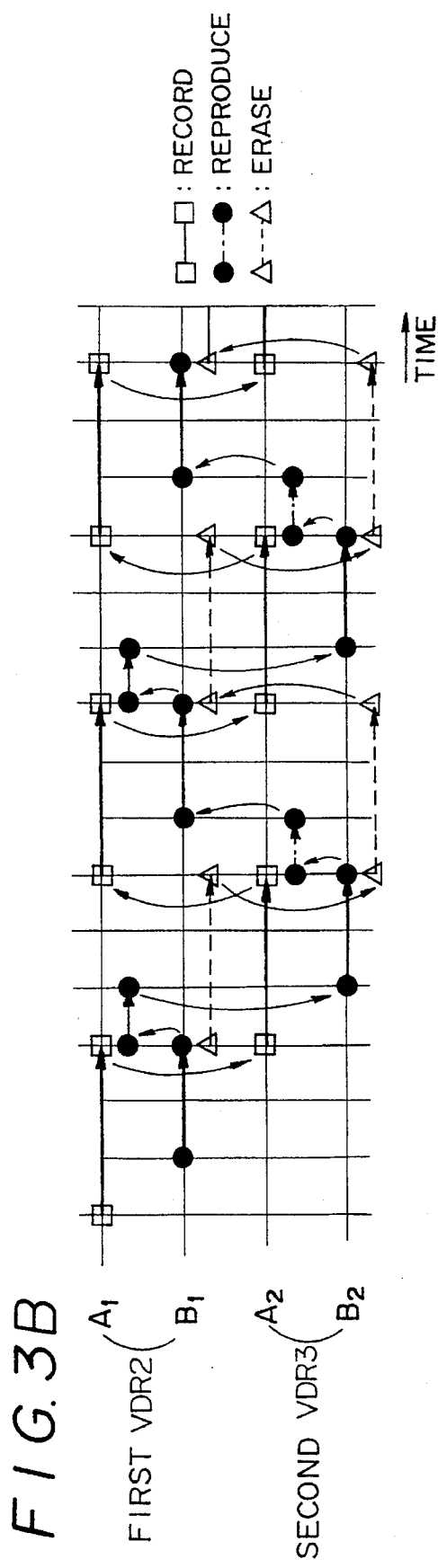
FIG. 3A
FIG. 3B

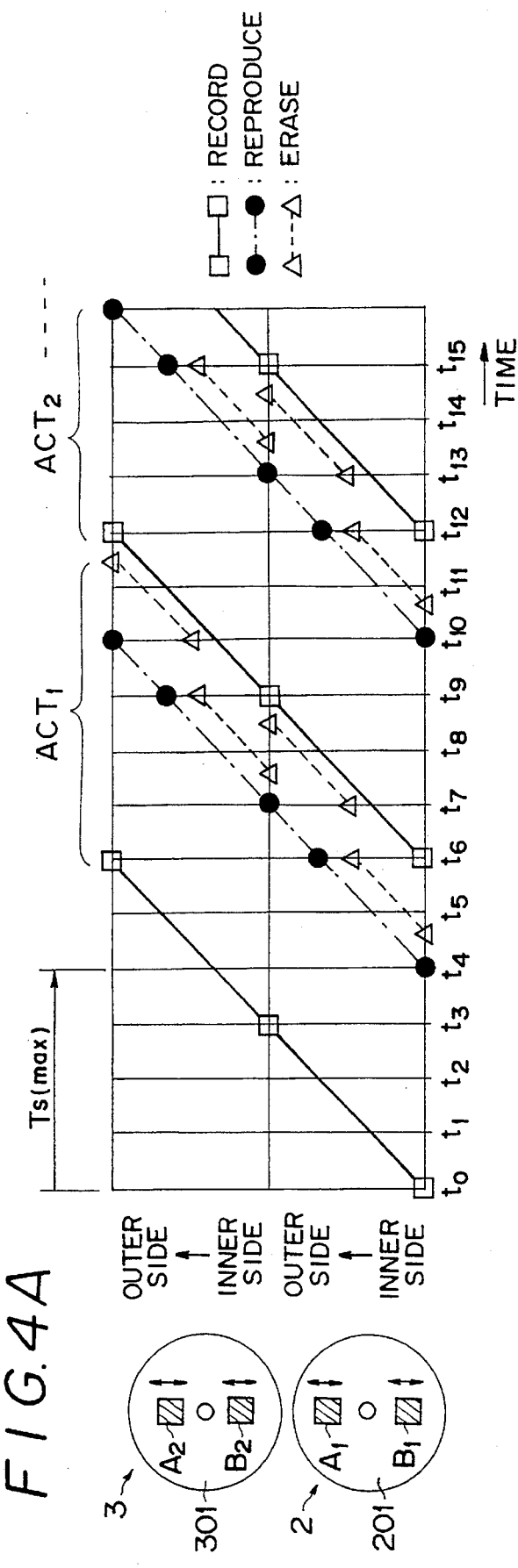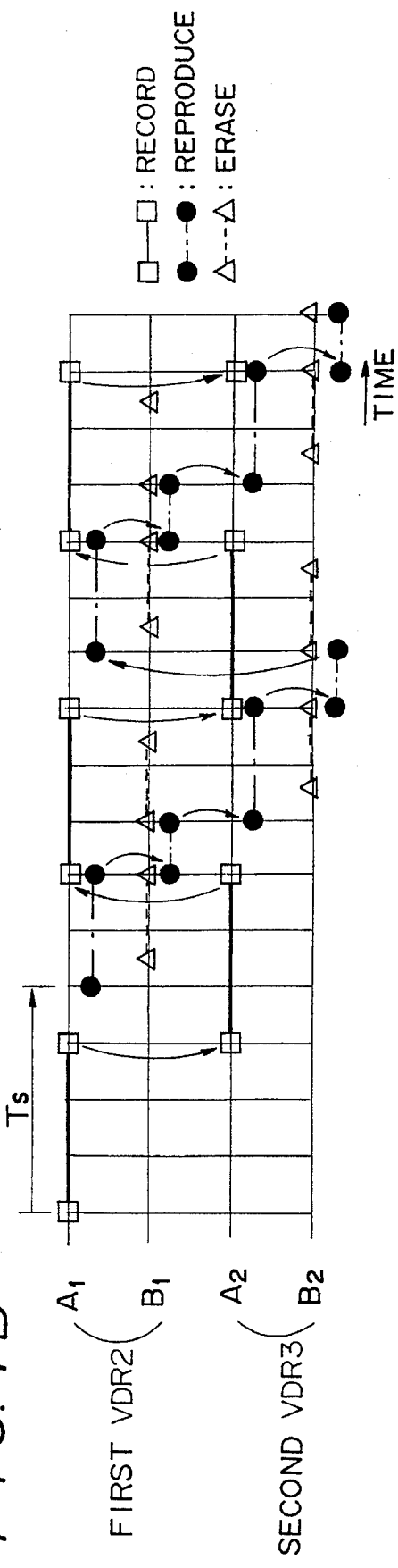
FIG.4A
FIG.4B

RECORDING/APPARATUS AND METHOD UTILIZING A PLURALITY OF HEADS FOR CONTINUOUSLY RECORDING INFORMATION AND REPRODUCING THE SAME WITH DELAY

This application is a continuation of application Ser. No. 08/066,577, filed May 26, 1993, now abandoned.

BACKGROUND OF THE INVENTION

1. Field of the Invention

This invention relates a device for and a method of recording and reproducing information on and from recording media, and more particularly to a device and method suitable for recording information and reproducing the same by a VDR (Video Disk Recorder) using a rewritable disk-shaped recording medium (hereinafter referred to as "optical video disk").

2. Description of the Prior Art

As a recording medium used for recording image information, there is generally known a tape-type recording medium such as a video tape, a semiconductor image memory such as a frame memory or a field memory, and a disk-type recording medium such as an optical video disk. These recording media are broadly used by general consumers, or for business use, etc.

In a broadcasting business at a broadcasting station there frequently occurs a case where a certain scene is required to be broadcasted again in an on-the-spot telecast for a sport event, etc. For example, in a broadcasting of a professional baseball game, a scene of home-run hit or a scene of fine play is frequently required to be again reproduced in a slow reproduction mode.

In this case, conventionally, an one-the-scene picture is recorded on a video tape while it is simultaneously broadcasted, and the video tape is rewound and reproduced when it is required.

On the other hand, in a case where a relay broadcasting is carried out over a nationwide network connecting plural local broadcasting stations with a key station at the center of the network, time allocation of broadcasting becomes frequently different between the key station and each local station. In this case, programs transmitted from the key station are not necessarily broadcasted in the local station according to the same time table for the program as that of the key station. In such a case, the local station omits a part of picture to be broadcasted, or a part of recorded pictures is broadcasted in place of some unimportant scenes. A video tape is frequently used for the recording of the pictures in such a case. The semiconductor image memory has a problem in recording capacity, and it requires a large memory capacity, so that the device becomes complicated and its cost becomes high. Therefore, it is difficult to adopt the semiconductor image memory.

As described above, the video tape which is excellently suitable for a long-term recording has been mainly used as a recording medium. However, it requires a long time for a searching operation including a tape rewinding operation, especially when a certain picture should be searched at high speed, because it is a linear recording medium.

SUMMARY OF THE INVENTION

It is an object of this invention to provide an information recording and reproducing device in which pictures for a certain time from the present to the past are recorded at all times, and which is capable of searching picture information at high speed and reproducing a picture with a certain delay time.

According to one aspect of the present invention, there is provided an information recording and reproducing device for recording and reproducing information on and from a plurality of rewritable disk-type recording media including: a plurality of recording/reproducing device for receiving and recording input information onto each of the recording medium and for reproducing and outputting the recorded information from each of the recording media with a predetermined delay time, each of the recording/reproducing device having a plurality of heads for recording and reproducing information, switching device for alternately selecting one of the reproduced information outputted from the plurality of recording/reproducing device, and control device for controlling the plurality of recording/reproducing device and the switching device. The control device permits the plurality of recording/reproducing device to continuously record the input information onto the plurality of disk-shaped recording media, and permits the switching device to alternately selecting one of the reproduced information so as to continuously output information reproduced by the plurality of recording/reproducing device.

According to another aspect of the present invention, there is provided a method of recording information on a plurality of rewritable disk-type recording media and reproducing the recorded information with a predetermined delay time using a plurality of recording/reproducing device, each of the plurality of recording/reproducing device including a plurality of heads, the method including the steps of: (a) recording input information onto one recording medium using a head included in one recording/reproducing device, (b) reproducing recorded input information from the one recording medium using one of the heads included in the one recording/reproducing device with a predetermined delay time from the start of the recording of input information onto the one recording medium, (c) recording input information onto another recording medium using a head included in another recording/reproducing device when the recording step (a) is terminated, (d) reproducing recorded information from another disk-type recording medium using one of the heads included in the another recording/reproducing device with the predetermined delay time from the start of the recording of input information onto the another recording medium when the step (b) is terminated, and (e) repeating the recording and reproducing steps for a plurality of times using the plurality of recording/reproducing devices so as to continuously reproduce the recorded information.

According to the present invention, under the control by the control signals from the control device, any one of the recording/reproducing means records input information at an address using a head, and reproduces and outputs the recorded information from the address with a predetermined delay time. The reproduced information is outputted through the switching device. Subsequently, when an amount of the recorded information reaches the recording capacity of the recording medium, another recording/reproducing device starts recording and reproducing operation in the same manner under the control by the control of the control device. The plurality of recording/reproducing device continuously carries out both of the recording and reproducing operation. Therefore, the input information recorded on the recording medium is reproduced with a predetermined delay time while the recording of the input information is continuously performed.

As described above, information of any time width which has once reproduced can be reproduced with a delay time

BRIEF DESCRIPTION OF THE DRAWINGS

FIGS. 2A and 2B are block diagrams showing the schematic construction of VDRs;

FIG. 3A and 3B are time charts of recording, reproducing and erasing operations in each VDR according to a first embodiment; and FIG. 4A and 4B are time charts of recording, reproducing and erasing operations in each VDR according to a second embodiment.

DETAILED DESCRIPTION OF THE PREFERRED EMBODIMENTS

Figure 1:
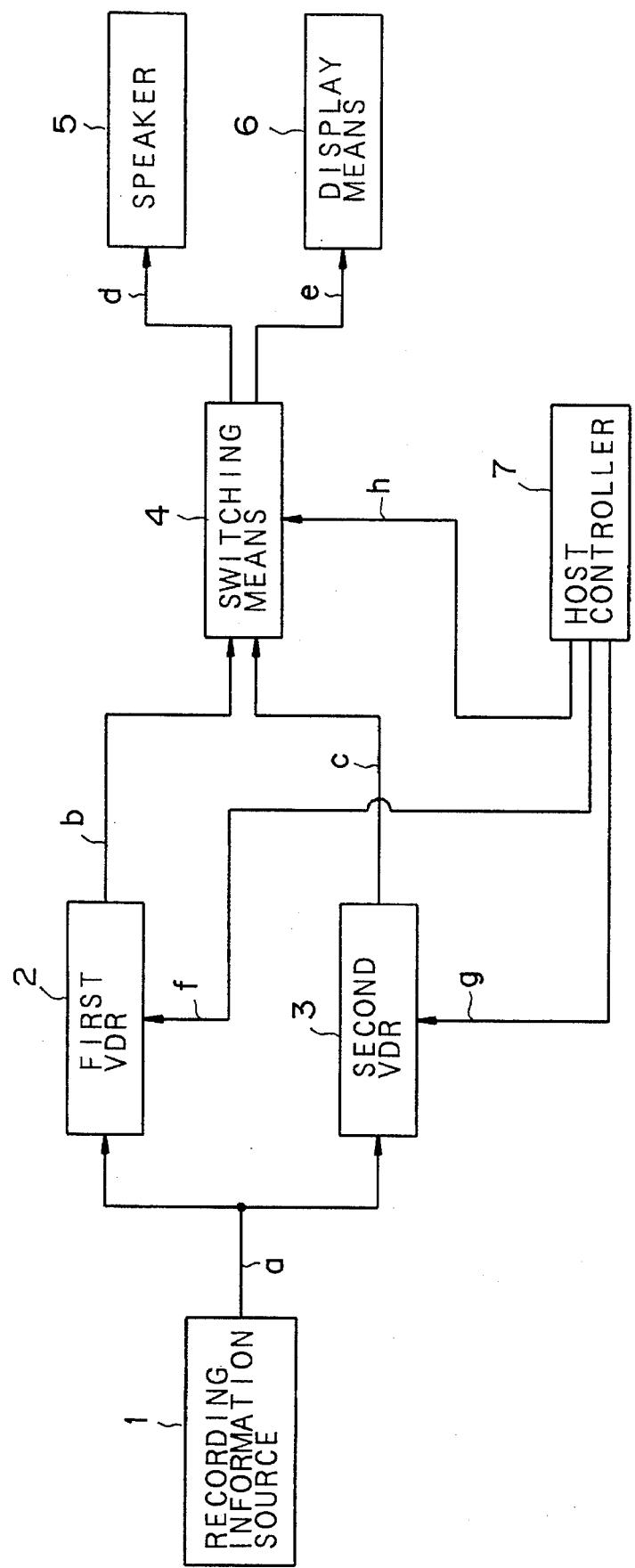
FIG. 1 is a block diagram showing the whole construction of an information recording and reproducing device according to this invention.

Preferred embodiments according to this invention will be described with reference to the accompanying drawings.

[I] First Embodiment

FIG. 1 shows the whole construction of an information recording and reproducing device according to a first embodiment of the present invention.

As shown in FIG. 1, the information recording and reproducing device includes a recording information source 1, a first VDR 2, a second VDR 3, a switching means 4, a speaker 5, a display means 6 and a host controller 7. The recording information source 1 such as a television camera outputs real-time information such as a relay broadcasting picture signal (composite signal). The first and second VDRs 2 and 3 receive input recording information A from the information recording source 1 simultaneously and in parallel, and carries out recording and reproducing operations under the control of the host controller 7 as described later. The switching means 4 selectively outputs any one of first and second VDR reproduction information B and C supplied from the first and second VDRs 2 and 3 under the control of the host controller 7. The host controller 7 controls the first VDR 2, the second VDR 3 and the switching means 4 by a recording/reproducing control signal F, a control signal G and a switching control signal H. The speaker 5 converts a reproduced audio signal D supplied from the switching means 4 into an acoustic signal, and outputs the acoustic signal. The display means 6 such as a CRT displays the reproduced picture signal E as an image.

FIGS. 2A and 2B show the constructions of the first and second VDRs 2 and 3. The first VDR 2 is so designed that video signals and audio signals can be recorded on a video disk 201 at CAV (constant angular velocity) for a relatively-long time, for example, for 32 minutes at maximum like a video tape recorder. This VDR 2 is an equipment for business use mainly used by professionals in a broadcasting station or a post-production, etc. Unlike the magnetic tape, it is impossible in this VDR to simply overwrite information because the optical video disk 201 used as a recording medium is a magneto-optical disk. Therefore, this VDR incorporates an erasing head and a recording head each of which can be independently operated. The erasing head erases the recorded information prior to the recording by the recording head, so that a pseudo-overwriting is carried out. Each of the heads is also used as reproducing head, and the erasing head can be kept in a stand-by state at a next reproducing position during the reproduction by the recording head. Therefore, reproduction of a picture to be transmitted to a monitor can be switched from the recording head to the erasing head at a desired timing, and thus an edition for a drama, etc. can be performed.

As shown in FIG. 2A, the optical video disk 201 is rotated at CAV by a spindle motor 202, and the recording, erasing and reproducing operations are carried out by the recording/reproducing head $A_1$ and the erasing/reproducing head $B_1$ under the constant rotation of the disk 201. The input recording information A is inputted through an audio input terminal $A_{IN}$ and a video input terminal $V_{IN}$, and is subjected to an appropriate signal processing and then recorded on the optical video disk 201 by the recording/reproducing head $A_1$. The first VDR reproduction information, which has been read out from the optical video disk 201 by the recording/reproducing head $A_1$ or the erasing/reproducing head $B_1$, is subjected to an appropriate signal processing in a reproducing system 204. Thereafter, the image information thereof is written in and read out from an image memory 205 on one-field unit basis (or one frame unit basis), and then outputted through a video output terminal $V_{OUT}$. The audio information is also outputted through an audio output terminal $A_{OUT}$. This information is transmitted to the display means 6 and the speaker 5 (see FIG. 1), respectively. During this operation, the recording, reproducing and erasing operations, servo operations such as a focusing servo, a tracking servo, etc. for the recording/reproducing head $A_1$ and the erasing/reproducing head $B_1$ and a rotational servo of the spindle motor 202 are carried out by a servo system 207 under the control of the controller 206. The controller 206 includes a CPU for performing general control of each of the elements in the first VDR 2 in addition to the above control operations. The controller 206 carries out the control operations in accordance with the recording/reproducing control signal F supplied from the host controller 7 so as to match the control operation with the operation of the whole system of this invention.

The second VDR 3 has the same construction as the first VDR 2, and a controller 306 carries out control operations matched with the system of this invention on the basis of the recording/reproducing control signal G supplied from the host controller 7.

In FIGS. 2A and 2B, the controllers 206 and 306 are individually provided and they are designed as a local controllers operated by the host controller 7. However, if the CPU itself has high processing capability, the controllers 206 and 306 and the host controller 7 may be constructed by one CPU.

Returning to FIG. 1, the switching means 4 includes switcher called as an AV (Audio Video) switcher and simultaneously switches both of the audio signal system and the video signal system in response to the switching control signal H. The switching means may be constructed by various kinds of semiconductor switch circuits.

As described above, the host controller 7 includes the CPU which serves to control the recording and reproducing operations of the first and second VDRs 2 and 3, and the switching operation of the switching means 4. The controller 7 has a built-in ROM or RAM in which a control sequence program constructed by an algorithm for the recording and reproducing operation as described later is stored.

Next, the operation of the information recording and reproducing device thus constructed will be described.

First, at a starting time, it is assumed in the first and second VDRs 2 and 3 that the spindle motors 202 and 303 start their rotation, that light emitting elements and photodetecting elements of the recording/reproducing head $A_1$, the erasing/reproducing head $B_1$, the recording/reproducing head $A_2$ and the erasing/reproducing head $B_2$ are operated, that the focusing servo and tracking servo for light beams from the light emitting elements are locked, and that a beam position is kept in a pause state at a position of frame address "1" on each of the optical video disks 201 and 301. At this time, each of the optical video disks 201 and 301 is assumed to be a non-written disk (blank disk) or to be a disk whose stored information is wholly erased. Under the above condition, the device is switched to a time delay recording and reproducing mode.

FIGS. 3A and 3B show time charts indicating operation of the recording/reproducing head $A_1$, the erasing/reproducing head $B_1$, the recording/reproducing head $A_2$ and the erasing/reproducing head $B_2$ in the time delay recording and reproducing mode. FIG. 3A is a graph whose abscissa represents the time and whose ordinate represents the motion and function of the respective heads on the optical video disks 201 and 301. FIG. 3B is a graph whose abscissa represents the time and whose ordinate represents the variation of the function which is assigned to the respective heads.

Referring to FIG. 3A, the recording/reproducing head $A_1$ of the first VDR 2 starts its recording operation on the optical video disk 201 at a time $t_0$, and continues the recording operation until a time $t_3$ which is due to the recording capacity of the optical video disk 201. That is, the optical video disk 201 is fully recorded at the time $t_3$.

Subsequently, at the time $t_1$ which is delayed from the time $t_0$ by a delay time $T_s$, the erasing/reproducing head $B_1$ starts reproduction from the address (frame address "1") at which the recording/reproducing head $A_1$ previously started the recording.

Then, at the time $t_3$, the erasing/reproducing head $B_1$ is switched to the erasing operation mode, and returned to the starting address (frame address "1") of the optical video disk 201 to start erasing. This is because information recorded on the optical video disk 201 should be erased prior to next recording. Since the erasing/reproducing head $B_1$ is switched from reproduction to the erasing at the time $t_3$, the recording/reproducing head $A_1$ searches a reproduction termination address of the erasing/reproducing head $B_1$ to start the reproduction at that address, and continues reproduction until a time $t_4$. By switching the recording/reproducing head $A_1$ from recording to reproduction, the reproduction of the recorded information from the optical video disk 201 is performed with a delay time $T_s$ from the real input time of the recording information.

On the other hand, at the time $t_3$, the input recording information A is recorded from the frame address "1" on the optical video disk 301 by the recording/reproducing head $A_2$. And at the time $t_4$, the recorded information is reproduced from the frame address "1" by the erasing/reproducing head $B_2$ with the delay time $T_s$ from there time $t_3$.

Next, at a time $t_6$ the recording on the optical video disk 301 by the recording/reproducing head $A_2$ is terminated, and the erasing/reproducing head $B_2$ is returned to the frame address "1" to start erasing. At the same time the recording/reproducing head $A_2$ starts reproduction from the reproduction terminating address of the erasing/reproducing head $B_2$.

Since the recording of the optical video disk 301 is terminated at the time $t_6$, the input recording information A is recorded on the optical video disk 201 side again. That is, at the time $t_6$ the recording/reproducing head $A_1$ starts recording from the frame address "1", the erasing/reproducing head $B_1$ starts reproduction from the frame address "1" at a time $t_7$. Subsequently, the similar recording, reproduction and erasing are repeated. In summary, a series of operations indicated as $ACT_1$ in FIG. 3A are repeated.

Considering the above operation from another viewpoint, it is described as shown in FIG. 3B. That is, the recording is alternately switched between the first and second VDRs 2 and 3 on a recording capacity unit basis of the optical video disks 201 and 301, the erasing of the disk is switched and carried out simultaneously with the termination of the recording, and then the reproduction is carried out with being delayed for a predetermined delay time $T_s$ while the recording/reproducing head $A_1$ and the erasing/reproducing head $B_1$ or the recording/reproducing head $A_2$ and the erasing/reproducing head $B_2$ are mutually selected and carry out the reproduction.

As shown in the figures, the delay time $T_s$ can be altered to any value within a maximum delay time $T_s(max)$ which corresponds to the recording capacity of the optical video disk 201 or 301. For example, if the optical video disk 201 or 301 can be recorded for 32 minutes at maximum, $T_s$ can be altered to any value within 32 minutes. The value $T_s$ can be set by rewriting data in a delay time table of the control sequence which is stored in the host controller 7, and more specifically it may be altered by changing the data in the RAM for storing the delay time table through a input key board or the like (not shown).

The access operation such as the address search operation of each of the recording/reproducing head $A_1$, the erasing/reproducing head $B_1$, the recording/reproducing head $A_2$ and the erasing/reproducing head $B_2$ can be executed using a well-known technique established for an ordinary LD player or the like.

[II] Second Embodiment

In the first embodiment as described above, the maximum delay time $T_s(max)$ is alterable to any value within the time corresponding to the storage capacity of one optical video disk 201 or 301. However, in the first embodiment, it is impossible to delay the reproduction over the maximum delay time which corresponds to the storage capacity of one optical video disk 201 or 301. The following second embodiment is capable of delaying the reproduction over the time corresponding to the storage capacity of one optical video disk 201 or 301.

The construction of the information recording and reproducing device of the second embodiment is the same as that of the first embodiment shown in FIGS. 1 and 2, and thus the description of the construction of this embodiment is omitted.

A different point between the first embodiment and the first embodiment resides in the algorithm for the recording and reproduction operation which is stored in the host controller 7, and this algorithm will be hereunder described together with the operation of this embodiment.

The initial condition of each part of the first and second VDRs 2 and 3 is identical to that of the first embodiment, and under this condition the device enters the time delay recording and reproducing mode described below.

FIGS. 4A and 4B are time charts showing the operation of the recording/reproducing head $A_1$, the erasing/reproducing head $B_1$, the recording/reproducing head $A_2$ and the erasing/reproducing head $B_2$ in the time delay recording and reproducing mode. FIG. 4A is a graph whose abscissa represents the time and whose ordinate represents the motion and the function of each head on the optical video disk 201 and 301. FIG. 4B is a graph whose abscissa represents the time and whose ordinate represents the variation of the function which is assigned to each head.

As shown in FIG. 4A, the recording/reproducing head $A_1$ of the first VDR 2 starts recording onto the optical video disk

201 at the time $t_0$, and continues recording until the time $t_3$ which corresponds to the storage capacity of the optical video disk 201. Subsequently, the recording/reproducing head $A_2$ of the second VDR 3 starts recording onto the optical video disk 301 at the time $t_3$, and continues recording until the time $t_6$ which corresponds to the storage capacity of the optical video disk 301.

At the time $t_4$ between the time $t_3$ and $t_6$, the recording/reproducing head $A_1$ of the first VDR 2 is switched to the reproducing mode, and starts reproduction from the frame address "1" of the optical video disk 201. That is, in this case, the reproduction is carried out with a delay time which exceeds the time corresponding to the recording capacity of the optical video disk 201.

After the recording of the recording/reproducing head $A_2$ of the second VDR 3, the recording/reproducing head $A_1$ of the first VDR 2 will start recording at the time $t_6$ again. Therefore, it is necessary to erase information on the optical video disk 201 prior to the recording by the recording/reproducing head $A_1$ from the time $t_6$. Accordingly, the erasing/reproducing head $B_1$ of the first VDR 2 is switched to the erasing mode at an intermediate point between the times $t_4$ and $t_5$ to perform the erasing operation until the time $t_6$. The erasing/reproducing head $B_1$ is switched to the reproducing mode at the time $t_6$, continues reproduction until the time $t_7$, and then terminates the reproduction from the optical video disk 201. At the time $t_7$, the erasing/reproducing head $B_1$ is switched to the erasing mode again, performs the erasing operation until an intermediate time between the time $t_8$ and the time $t_9$, and then terminates erasing information recorded on the optical video disk 201. At the time $t_6$, the recording/reproducing head $A_1$ starts recording and continues recording until the time $t_9$. Then, the recording/reproducing head $A_2$ of the second VDR 3 is switched to the recording mode at the time $t_9$.

At the time $t_6$, since the erasing operation of the erasing/reproducing head $B_1$ of the first VDR 2 is interrupted, the erasing/reproducing head $B_1$ is switched to the erasing mode again at the time $t_7$, continues the erasing operation until an intermediate time between the times $t_8$ and $t_9$, and then terminates the whole erasing operation for the optical video disk 201.

On the other hand, since it is necessary to erase the optical video disk 301 prior to the recording of the recording/reproducing head $A_2$ of the second VDR 3 from the time $t_9$ to the time $t_{11}$, the erasing/reproducing head $B_2$ is switched to the erasing mode at an intermediate time between the times $t_7$ and $t_8$, and performs the erasing operation until the time $t_9$. Thereafter, at the time $t_9$, the erasing/reproducing head $B_2$ starts reproduction in place of the recording/reproducing head $A_2$ until the time $t_{10}$. Thereafter, the erasing/reproducing head $B_2$ enters the erasing mode again at the time $t_{10}$, and the erasing of information on the optical video disk 301 is terminated at an intermediate time between the times $t_{11}$ and $t_{12}$.

Subsequently, a series of operations of the $ACT_1$ are repeated in the order of $ACT_2, \ldots$, in the same manner as described above. Considering the above operation in FIG. 4B with paying attention to the motion of each head, the recording is alternately executed onto one of the optical video disks 201 and 301 using the first and second VDRs 2 and 3, and the reproduction of the recorded information is started with a predetermined delay time $T_s$. In this operation the erasing of the information is carried out prior to the next recording onto that disk is started.

As described above, according to the second embodiment, the maximum delay time $T_s(max)$ can be set to a value over the time corresponding to the recording capacity of the optical video disk 201 or 301, and thus the time delay operation can be carried out with higher degree of freedom. If the maximum recording time of the optical video disks 201 and 301 is 30 minutes, according to this embodiment, any time delay can be made in a range from (a time corresponding to three times of frame address searching) to (45 minutes—the time corresponding to three times of the frame address searching).

In the above embodiments, the optical video disks 201 and 301 are assumed to be a blank disk at the initial time. However, it is sufficient that at least the optical video disk which is firstly recorded (disk 201 in this example) is wholly erased. This is because the other optical video disk (disk 301) to be subsequently recorded can be erased between the times $t_0$ and $t_4$ in FIGS. 3A and 3B and between the times $t_0$ and $t_6$ in FIGS. 4A and 4B by the erasing/reproducing head $B_2$ of the second VDR 3 side prior to the recording operation of the recording/reproducing head $A_2$.

As described above, according to this invention, a series of recording information is alternately recorded on a disk-type recording medium by plural recording/reproducing means, and the reproduction of the recorded information is carried out with a certain delay time by switching the recording/reproducing means, so that the recording and reproducing operation can be carried out for the long-time recording information. In this case, a past image information having any time width can be reproduced on a real-time basis by the high-speed searching operation, and the input information can be continuously recorded and reproduced without interruption.

What is claimed is:

1. An information recording and reproducing device for recording and reproducing information on and from a plurality of rewritable disk-type recording medium, said device comprising:

a plurality of recording/reproducing means, each having a plurality of heads, for receiving and recording input information onto said recording medium using one of the plurality heads and for simultaneously reproducing and outputting the recorded information from the same recording medium, in parallel with the recording, using one of the plurality of heads which is different from the one being used for the recording, said reproducing and outputting having a predetermined delay time from the recording, respectively;

switching means for alternatively selecting one of the reproduced information outputted from said plurality of recording/reproducing means; and control means for controlling said plurality of recording/reproducing means and said switching means, wherein said control means alternately selects one of said plurality of recording/reproducing means to continuously record the input information onto said plurality of disk-type recording medium in an order, and permit said switching means to alternately select one of the reproduced information so as to continuously output information reproduced by said plurality of recording/reproducing means in the order.

2. A device according to claim 1, wherein each of said recording/reproducing means reproduces the information recorded on the recording medium by alternately using the plurality of heads.

3. A device according to claim 1, wherein said recording/reproducing means reproduces the information recorded on the recording medium from an address on which recording of input information is started.

4. A device according to claim 1, wherein said switching means selects another recording/reproducing means when reproduction of the recorded information by one recording/reproducing means being selected is terminated.

5. A method of recording information on a plurality of rewritable disk-type recording medium and reproducing the recorded information with a predetermined delay time using a plurality of recording/reproducing means, each of said plurality of recording/reproducing means comprising a plurality of heads, said method comprising the steps of:

(a) recording input information onto a first recording medium using a head included in a first recording/reproducing means;

(b) simultaneously with recording step (a), reproducing recorded input information from said first recording medium using one of the heads included in said first recording/reproducing means, which is different from the head being used for recording in the recording step (a), this reproducing step (b) having a predetermined delay time from the start of the recording step (a);

(c) recording input information onto a second recording medium different from the first recording medium using a head included in a second recording/reproducing means which is different from the first recording/reproducing means when the recording step (a) is terminated;

(d) simultaneously with the recording step (c) reproducing recorded information from said second recording medium using one of the heads included in said second recording/reproducing means, which is different from the head being used for recording in the recording step (c), when the step (b) is terminated, this reproducing step (d) having the predetermined delay time from the start of the recording step (c); and repeating said recording and reproducing steps for a plurality of times using said plurality of recording/reproducing means so as to continuously reproduce the recorded information.

* * * * *